(No Model.)
W. B. BELL.
SASH CORD FASTENER.
No. 436,688. Patented Sept. 16, 1890.
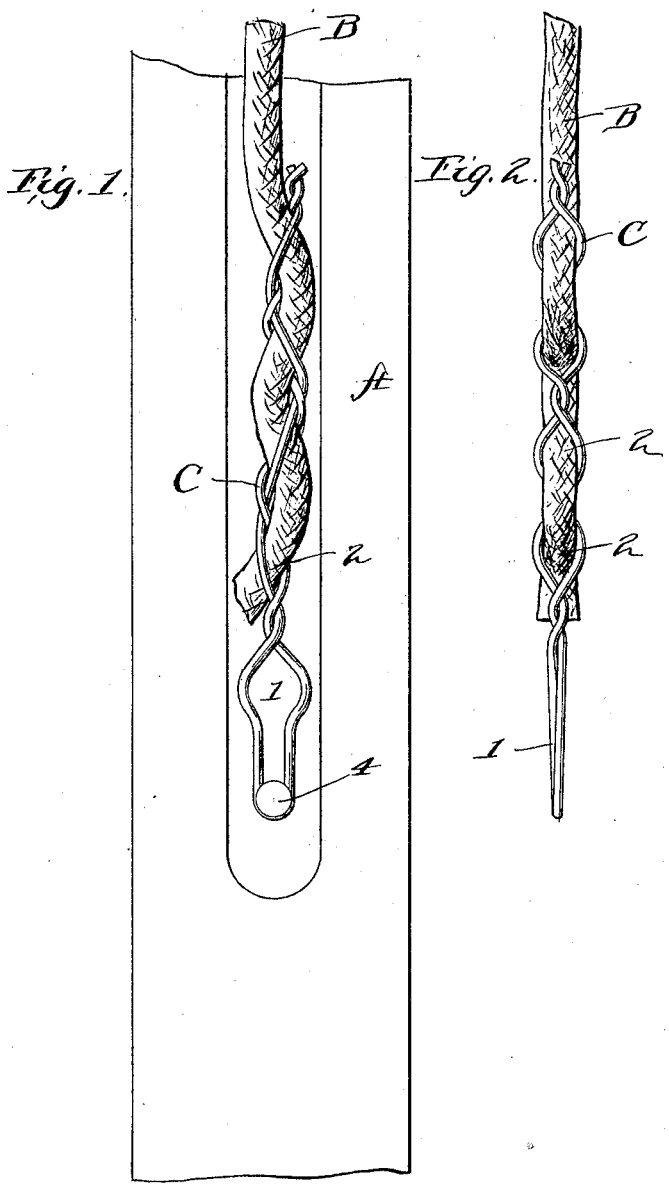
Witnesses
W. P. Keene.
F. L. Middleton.
Inventor
Wm. B. Bell
By Ellis Spear
Attys.

UNITED STATES PATENT OFFICE.

WILLIAM B. BELL, OF DENVER, COLORADO.

SASH-CORD FASTENER.

SPECIFICATION forming part of Letters Patent No. 436,688, dated September 16, 1890.

Application filed March 25, 1890. Serial No. 345,253. (No model.)

*To all whom it may concern:*

Be it known that I, WILLIAM B. BELL, of Denver, in the county of Arapahoe and State of Colorado, have invented a new and useful Improvement in Sash-Cord Attachments; and I do hereby declare that the following is a full, clear, and exact description of the same.

My invention consists of a wire twisted about itself at intervals to form a series of openings in which the cord is held and having a loop or similar device for attachment within the groove of the sash.

In the drawings, Figure 1 is a front view, and Fig. 2 a side elevation.

In the drawings, A is the sash, of ordinary form; B, the sash-cord, and C the fastener. This latter consists of a wire bent to form an elongated loop or eye 1 at its lower end, adapted to receive the holding-stud 4, by which the fastener is held to the sash. The two ends of the wire are twisted about each other at intervals, forming a series of openings 2, in which is located the end of the cord, this extending sinuously through said openings to secure the desired binding effect. The joining of the cord and wire is preferably done by twisting the wire about the cord, so that it will grip the same positively, though a good result may be secured by passing the cord through the fastener after it is fully formed.

I claim as my invention—

A sash-cord fastener consisting of a wire bent to form a loop or eye at its lower end and twisted about itself at intervals to form a series of openings, substantially as described.

In testimony whereof I have signed my name to this specification in the presence of two subscribing witnesses.

WILLIAM B. BELL.

Witnesses:
C. W. LORD,
JAMES H. WALL.